(12) United States Patent
Becker

(10) Patent No.: US 7,720,643 B1
(45) Date of Patent: May 18, 2010

(54) ESTIMATING PROCESSOR USAGE

(75) Inventor: Glen Alan Becker, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/860,419

(22) Filed: Sep. 24, 2007

(51) Int. Cl.
*G06F 11/34* (2006.01)
*G06F 19/00* (2006.01)

(52) U.S. Cl. .................. 702/186; 702/183; 702/182; 709/226

(58) Field of Classification Search ............... 702/186, 702/183
See application file for complete search history.

(56) References Cited

U.S. PATENT DOCUMENTS

| | | |
|---|---|---|
| 7,302,687 B2 | 11/2007 | Austin |
| 7,383,548 B2 | 6/2008 | Boon et al. |
| 2001/0044909 A1 | 11/2001 | Oh et al. |
| 2004/0254765 A1 | 12/2004 | Lee et al. |
| 2005/0081183 A1 | 4/2005 | Accapadi et al. |
| 2005/0086660 A1 | 4/2005 | Accapadi et al. |
| 2006/0085368 A1* | 4/2006 | Moilanen et al. .............. 706/45 |
| 2006/0136176 A1 | 6/2006 | Lee et al. |
| 2006/0212269 A1* | 9/2006 | Lee et al. .................... 702/186 |
| 2007/0174839 A1 | 7/2007 | Takahashi et al. |
| 2008/0022284 A1* | 1/2008 | Cherkasova et al. ......... 718/104 |
| 2008/0098397 A1 | 4/2008 | Accapadi et al. |

OTHER PUBLICATIONS

Funk, M. "Simultaneous Multi-Threading (SMT) on eServer iSeries POWER5 Processors." IBM, May 2004, p. 1-19, [retrieved from the Internet on Jan. 31, 2008 using <URL:http://www-03.ibm.com/servers/eserver/iseries/perfmgmt/pdf/SMT.pdf>].

Cazorla, F., Knijnenburg, P., Sakellariou, R., Fernandez, E., Ramirez, A., and Valero, M. "Predictable Performance in SMT Processors: Synergy between the OS and SMTs." IEEE Transactions on Computers, Jul. 2006, vol. 55, No. 7, p. 785-799.

Zheltov, S. and Bratanov, S. "Measuring Performance on HT-Enabled Multi-Core: Advantages of a Thread-Oriented Approach." Intel Corporation, Sep. 5, 2006, [retrieved from the Internet on Jan. 31, 2008 using <URL: http://softwarecommunity.intel.com/articles/eng/2647.htm>].

Mackerras, P., Mathews, T., and Swanberg, R. "Operating system exploitation of the POWER5 system." IBM Journal of Research and Development, Jul./Sep. 2005, vol. 49, No. 4/5, p. 533-539.

* cited by examiner

*Primary Examiner*—Hal D Wachsman
(74) *Attorney, Agent, or Firm*—Brooks, Cameron & Huebsch, PLLC

(57) ABSTRACT

Methods and systems are disclosed for determining a processor usage adjustment factor and for automatically applying the processor usage adjustment factor to provide an accurate processor usage estimate for an SMT processor. In one implementation, the methods and systems obtain samples of processor usage reported by the operating system at a predefined sampling rate over a predefined sampling interval. Thread states for the threads substantially corresponding to the reported processor usage are so obtained at the predefined sampling rate and over the predefined sampling interval. This sampling may be performed for servers running different applications and having diverse processing loads. An estimate of the distribution of the number of threads running for the processor usage reported may then be determined from the sampled data. A processor usage adjustment factor may then be derived, based on the distribution, and used to provide a more accurate processor usage estimate.

21 Claims, 7 Drawing Sheets

Processor Usage Tuner
320

User Interface
400

Processor Usage Acquisition
402

Processor Usage Correction
404

Data Compilation
406

FIG. 4

ESTIMATING PROCESSOR USAGE

CROSS-REFERENCE TO RELATED APPLICATIONS

This application is related in subject matter to, and incorporates herein by reference in its entirety, each of the following: U.S. patent application entitled "Estimating Processor Throughput," application Ser. No. 11/860,412, filed on the same date as this application; and U.S. patent application entitled "Estimating Processor Throughput," application Ser. No. 11/860,416, also filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to estimates of processor throughput and, more specifically, to systems and methods for adjusting such throughput estimates in SMT processors to account for distortions in measured usage.

BACKGROUND

Simultaneous Multi-Threading, or SMT, is a processor design in which a single CPU can execute multiple program threads in parallel. A "thread," as understood by those having ordinary skill in the art, is a stream of instructions (e.g., add, divide, branch, etc.) that are executed by the processor. The Pentium 4 Processor with HT Technology from Intel Corp. of Santa Clara, Calif. is an example of an SMT processor, as is the POWER5 processor from International Business Machines Corp. of Armonk, N.Y. For purposes of this description, the terms "processor" and "CPU" are used interchangeably.

In a typical SMT processor, one physical CPU can have two threads running simultaneously. This is in contrast to a duo core processor where there are actually two discrete physical processors combined in a single package, with each core being capable of executing one thread. Depending on the particular processor manufacturer, SMT processors can provide significant improvements in processor throughput (e.g., 20%-30% according to Intel, 30%-40% according to IBM) over traditional or single threaded processors. The term "throughput" is used herein to mean the rate at which a processor can execute instructions, typically expressed in instructions per second.

A drawback of SMT processors is that it causes certain software operating systems to distort the level of CPU usage. For example, Windows Server 2003 has been known to report significantly distorted CPU utilization on Intel SMT processors. In many case, an SMT processor was reported by Windows Server 2003 as being only 50% busy when it was actually running closer to 83% of its maximum throughput. Such a distortion of the processor's usage may result in a misperception that the processor can accept additional processing load, which may lead to sluggish or otherwise unacceptable system performance. The distortion may also adversely impact the ability of capacity planners, for example, to accurately forecast the number of servers a company may require going forward.

Accordingly, what is needed is a way to more accurately estimate CPU usage on SMT processors. More specifically, what is needed is a way to determine a CPU usage adjustment factor for SMT processors and to automatically apply the CPU usage adjustment factor to provide a more accurate CPU usage estimate for SMT processors.

SUMMARY

The disclosed embodiments are directed to methods and systems for determining a CPU usage adjustment factor and for automatically applying the CPU usage adjustment factor to provide a more accurate CPU usage estimate for an SMT processor running a thread-aware operating system. In one implementation, the methods and systems obtain samples of CPU usage as reported by the operating system at a predefined sampling rate and over a predefined sampling interval. Thread states for the threads substantially corresponding to the reported CPU usage are so obtained at the predefined sampling rate and over the predefined sampling interval. This sampling may be performed for several servers running different applications and having diverse processing loads. An estimate of the distribution of the number of threads running for the CPU usages reported may then be determined from the sampled data. A CPU usage adjustment factor may then be derived based on the distribution that may be used to provide a more accurate CPU usage estimate.

BRIEF DESCRIPTION OF THE DRAWINGS

The foregoing and other advantages of the invention will become apparent from the following detailed description and upon reference to the drawings, wherein:

FIG. 4 illustrates an exemplary processor usage tuner for compensating CPU usage estimates according to the disclosed embodiments;

DETAILED DESCRIPTION

Figure 1:
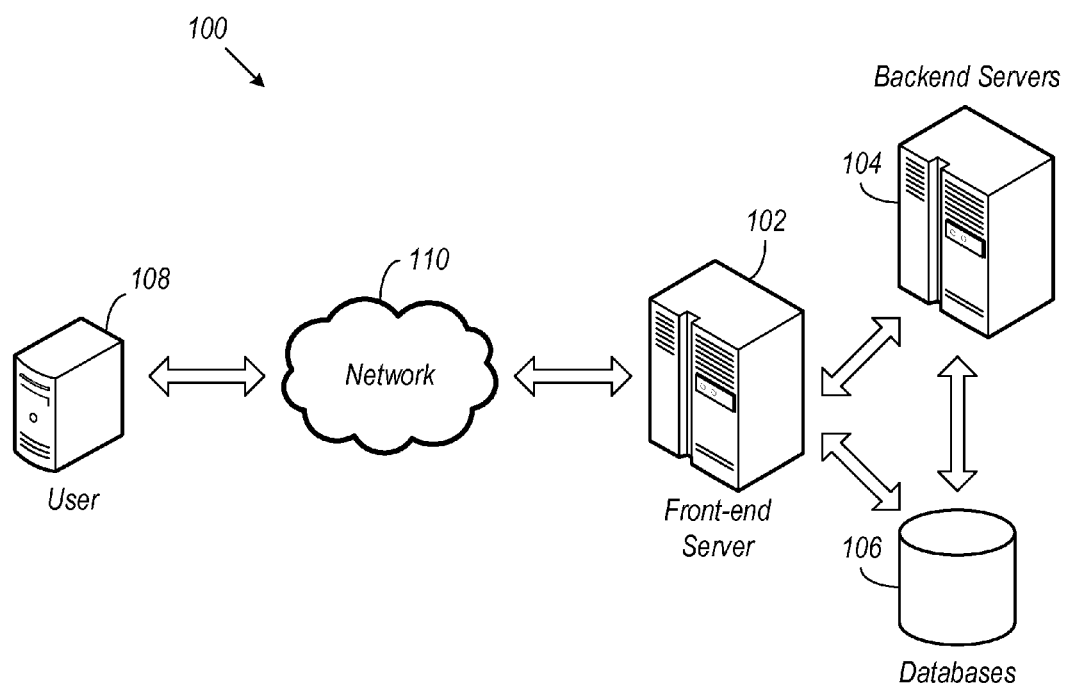
FIG. 1 illustrates an exemplary infrastructure for compensating CPU usage estimates according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure 100 is shown for providing CPU usage estimates according to the disclosed embodiments. The exemplary infrastructure 100 is typical of infrastructures found in many companies insofar as it has numerous computing units running various types of applications. In the example shown here, the infrastructure 100 may include a front-end server 102, various backend servers 104, and one or more databases 106, all interconnected as shown. The front-end server 102 may operate as a host for a Web site to which a user 108 may connect over a network 110 to access various products and/or services. The backend servers 104 and databases 106 typically provide the actual programming and processing that support the various products and/or services offered by the Web site.

As a company grows and expands, more computers and servers may need to be added to the infrastructure 100. Computers and servers, however, are enormously expensive in terms of equipment capital, software licensing fees, support and maintenance man-hours, and other costs. Thus, a company must carefully consider and plan for a capacity expansion well before proceeding with the expansion. The planning can be made more difficult if historical trends on CPU usage are inaccurate, as may be the case with SMT processors.

Because of their simultaneous thread execution, SMT processors usually appear to an operating system as two different processors, each usually running one thread. These processors are commonly referred to as logical processors, whereas the actual processor itself is the physical processor. A physical SMT processor with one logical processor running a normal thread and the other logical processor being idle is an unshared processor. The throughput that an unshared SMT processor can deliver as a percentage of its maximum throughput is referred to herein as the Unshared SMT%. If both logical processor are running and the threads are constructive threads (and not idle threads), then the SMT processor is sharing resources between the two threads. The incremental increase in throughput resulting from having both threads running is referred to herein as the SMT Benefit%. This SMT Benefit% may vary and has been observed to be about 20%-30% for Intel SMT processors and about 30%-40% for IBM SMT processors. Conversely, the performance decrease resulting from an unshared SMT processor is referred to herein as the SMT Cost%. This SMT Cost% has been reported to be negligible (e.g., less than 1%). Based on the foregoing definitions, the unshared throughput or Unshared SMT% of one logical processor, with and without the SMT Cost%, may be expressed as follows:

$$\text{Unshared SMT\%}=100\%/(100\%+\text{SMT Benefit\%}) \quad (\text{Eq. 1})$$

$$\text{Unshared SMT\%}=(100\%-\text{SMT Cost\%})/(100\%+\text{SMT Benefit\%}) \quad (\text{Eq. 2})$$

Thus, assuming the SMT Benefit% is 20%, as has been reported by Intel, then according to Equation 1, the Unshared SMT% is $100/120$, or 83%. This means that one logical processor running by itself may actually be consuming about 83% of the physical SMT processor's throughput. Unfortunately, when only one logical processor is running, certain thread-aware operating systems, such as Windows Server 2003, report the physical SMT processor's throughput as 50%, reflecting the fact that only one of the two logical processors is running. While a reported 50% CPU usage may mean that, on average, the number of running threads is equal to half the number of logical processors, the actual number of running threads at any point in time may vary. Thus, a reported 50% CPU usage may be accurate, or it may be grossly distorted, depending on the distribution of the number of running threads.

The above distortion may vary with the number of physical SMT processors in use. Table 1 below illustrates the distortion for a server with two physical SMT processors (i.e., four logical processors). In Table 1, it is assumed that all five scenarios (or states) are equally possible. As can be seen, a significant difference exists between the average throughput and the reported CPU usage, with the average distortion for all five scenarios being approximately 13%.

TABLE 1

| Running Threads | Physical CPU #1 | | Physical CPU #2 | | Average Throughput | Reported CPU % | Distortion |
|---|---|---|---|---|---|---|---|
| | Threads | Throughput | Threads | Throughput | | | |
| 0 | 0 | 0% | 0 | 0% | 0% | 0% | 0% |
| 1 | 1 | 83% | 0 | 0% | 41% | 25% | 16% |
| 2 | 1 | 83% | 1 | 83% | 83% | 50% | 32% |
| 3 | 2 | 100% | 1 | 83% | 91% | 75% | 16% |
| 4 | 2 | 100% | 2 | 100% | 100% | 100% | 0% |
| Averages (assuming flat distribution of number of threads) | | | | | 63% | 50% | 13% |

To correct the distortion, ideally, the distribution of the number of running threads should be determined for the CPU usages reported. However, this distribution depends largely on the behavior of the applications running on the processor and the reported level of CPU usage. Unfortunately, Windows Server 2003 and similar operating systems provide no easy way to obtain this information and, as a result, others ways of obtaining the information must be used. One way to obtain the distribution information is to determine the actual thread states of the threads corresponding to the CPU usage being reported for each logical processor. Such thread state determination may be performed, for example, using a process similar to Thread State Counter provided with Windows Server 2003. However, because of the sheer volume of data that would result (the processor executes millions of instructions per second), it may be desirable to limit the number of data points, for example, by only obtaining a selected few CPU usages and the thread states corresponding thereto.

As an example, in one recent implementation, the CPU usage and thread states were sampled once per second over a one-hour interval using Thread State Counter. The sampling was done for a variety of servers during a time period when CPU usage was reported between 30% and 70%. The server applications were substantially diverse and included two intranet servers, four application servers, three SQL database servers, one fax server, two file servers, one exchange server, one security server, and one active directory server. The thread states were then categorized into one of three groups: (1) overhead threads resulting from the use of the Windows Server 2003 processes "Typeperf" or "Smlogsvc" to read the thread states; (2) idle threads resulting from the System Idle process; and (3) all other threads. Only the third category of threads was retained, as the other two categories may not be legitimate threads.

From the data collected, a distribution function was derived to predict the probability that exactly N threads are running given a particular level of reported CPU usage (CPU%), as shown in Equation 3. Using this equation, a fairly accurate estimate of the actual distribution of running threads at various levels of reported CPU usage was obtained by grouping the reported CPU usage according to the nearest 10%.

$$\Sigma p(N, CPU\%) = 1 \quad \text{(Eq. 3)}$$

The processor throughput, or Throughput%, was then calculated according to Equation 4 below, where U% is a shorthand version of the Unshared SMT% of Equation 1, N is the number of running threads, P is the number of physical processors, and L is the number of logical processors.

$$Throughput\% = \sum p(N, CPU\%) * U\% * N / P + \\ \sum p(N, CPU\%) * (U\% * (L-N) + 100\% * (N-P))/P \quad \text{(Eq. 4)}$$

where $0 \leq N \leq P$ where $P < N \leq L$

In Equation 4, the first line represents periods during the measurement interval when each thread was assigned its own physical processor, and the processor was delivering between 0% and U% of its maximum throughput. The second line represents periods when all physical processors were busy, and some processors had to be shared, with the L-N unshared processors delivering U% of their maximum throughput, and the N-P shared processors delivering their full maximum throughput. Dividing the results by P converts the units from fractional processors to fractions of the whole server.

Figure 2:
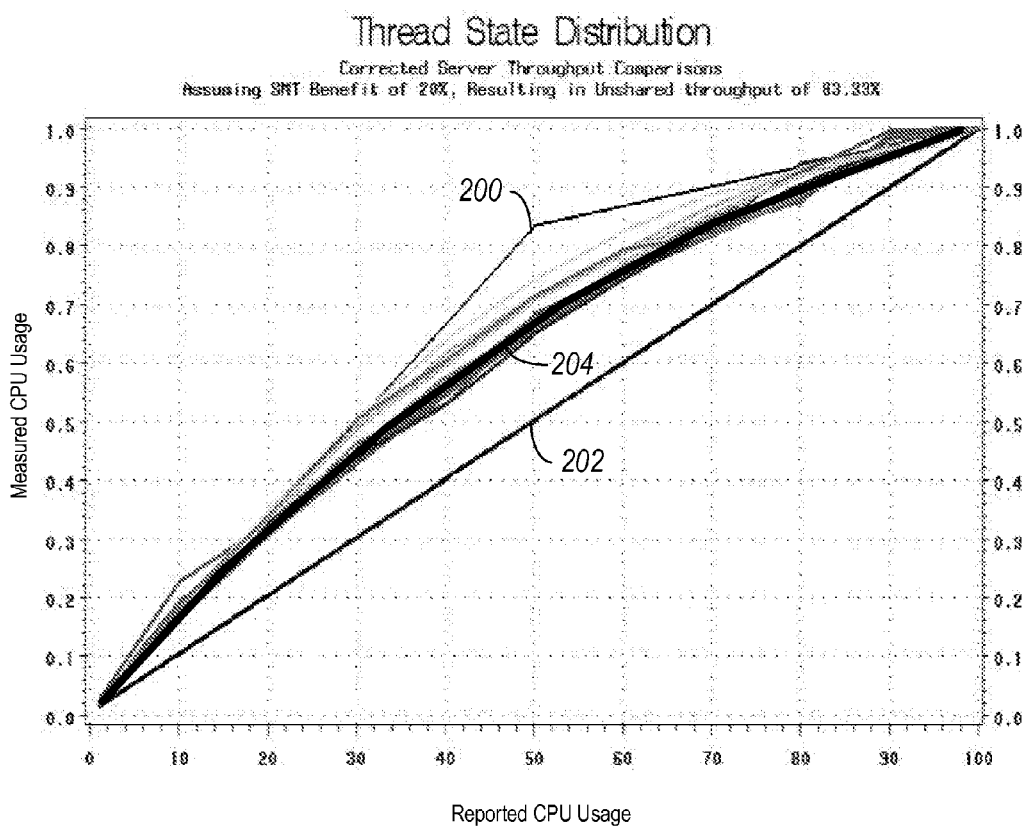
FIG. 2 illustrates a graph of measured processor throughput versus reported processor throughput according to the disclosed embodiments.

Applying Equation 4 to the data collected for the various servers above and plotting the results for each sever resulted in the graphs shown in FIG. 2. In FIG. 2, the horizontal axis represents the processor throughput as reported by Windows Server 2003, and the vertical axis represents "measured" processor throughput (normalized) insofar as the throughputs are based on collected data. The topmost curve 200 and bottom most curve 202 represent the theoretical maximum overstatement and maximum understatement of processor throughput, assuming a 20% SMT benefit.

As can be seen, while the largest absolute distortion between reported CPU usage and actual throughput occurs at 50% CPU usage, the greatest relative distortion occurs at very low CPU usage. For example, a server that is reported as having only 20% CPU usage is likely to be using 33% of its potential throughput because at such low CPU usage, physical CPUs are almost never shared. The distortion percentage can be obtained by dividing the 33% throughput by the 20% benefit, resulting in a distortion of 67%.

Because of the distortion, capacity planners must be careful in predicting computer or server capacity, particularly at low reported utilizations. The large relative distortion that exists at low utilizations may lull an unwary capacity planner into thinking, for example, that a reported 20% CPU usage means only using ⅕ of a server is being used, when in reality about ⅓ of it is actually being used. The capacity planner would need to account for the distortion before basing any capacity decisions and/or business decisions on the compensated CPU usage. Thus, for example, the capacity planner may need to adjust projections of CPU usage that may be needed going forward if the current CPU usage or the projected CPU usage involves SMT processors.

Note in FIG. 2 that, despite the varied and diverse natures of the fifteen servers and the applications running thereon, the individual curves are relatively close to one another and have the same general shape. Based on this closeness and similarity of shape, it is possible to derive a single curve that could be used to represent the various curves of the present group of servers. Other representative curves may be derived for other groups of servers, depending on the applications running on the servers. Such a representative curve, indicated by the thick line labeled 204, may be derived, for example, by taking an average of the individual curves. Various curve fitting techniques known to those having ordinary skill in the art, such as regression analysis, may then be used to develop an equation for the representative curve 204. Such an equation mathematically describes the representative curve 204 and be used as an adjustment factor for any one of the servers. Specifically, the equation/adjustment factor may produce a new CPU usage that compensates for the distortion in the reported CPU usage provided by Windows Server 2003 (and similar thread-aware operating systems).

In some embodiments, however, instead of taking an average of the individual curves in FIG. 2, an equation may be derived to specifically describe each individual curve mathematically using, again, well-known curve fitting techniques. Because each curve represents one server, each equation would be applicable only to that server. The server-specific equations may then be used to calculate a compensated CPU usage for each server. Of course, to ensure the reliability of the server-specific compensations, care should be taken by those having ordinary skill in the art to make sure the underlying data for each server is obtained over a sufficiently long time and/or using a sufficiently large number of samples to produce a statistically valid result.

In some embodiments, instead of using an equation as the adjustment factor to calculate a compensated CPU usage, a lookup table may be created from the data. Such a lookup table may describe the representative curve 204 (or server-specific curves) numerically instead of mathematically. The CPU usage may then be looked up in the lookup table to determine the compensated value.

Figure 3:
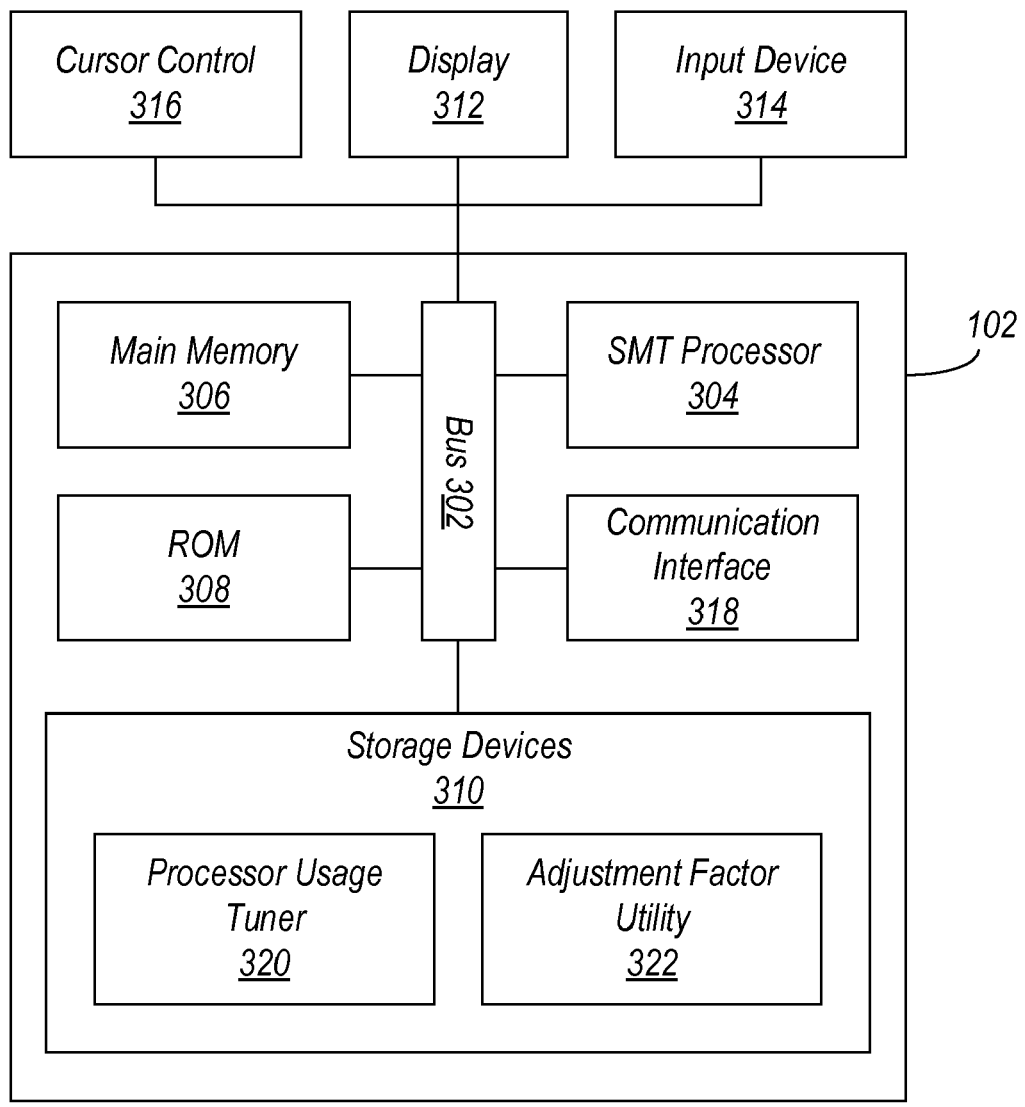
FIG. 3 illustrates an exemplary system for compensating CPU usage estimates according to the disclosed embodiments.

In accordance with the disclosed embodiments, each one of the front-end server 102, backend server 104, and/or database 106 (FIG. 1) that uses an SMT processor may be configured to compensate for distortions in reported CPU usage. FIG. 3 illustrates an example of the front-end server 102 being configured in this manner. Any suitable computer known to those having ordinary skill in the art may be used as the front-end server 102, including a personal computer, workstation, mainframe, and the like. The backend server 104 and/or database 106 may have a similar design and are therefore not described in detail here.

The front-end server 102 typically includes a bus 302 or other communication mechanism for communicating information and an SMT processor 304 coupled with the bus 302 for processing information. The front-end server 102 may also include a main memory 306, such as a random access memory (RAM) or other dynamic storage device, coupled to the bus 302 for storing computer-readable instructions to be executed by the SMT processor 304. The main memory 306 may also be used for storing temporary variables or other intermediate information during execution of the instructions to be executed by the SMT processor 304. The front-end server 102 may further include a read-only memory (ROM) 308 or other static storage device coupled to the bus 302 for storing static information and instructions for the SMT processor 304. A computer-readable storage device 310, such as a magnetic, optical, or solid state device, may be coupled to the bus 302 for storing information and instructions for the SMT processor 304.

The front-end server 102 may be coupled via the bus 302 to a display 312, such as a cathode ray tube (CRT) or liquid crystal display (LCD), for displaying information to a user. An input device 314, including, for example, alphanumeric and other keys, may be coupled to the bus 302 for communicating information and command selections to the SMT processor 304. Another type of user input device may be a cursor control 316, such as a mouse, a trackball, or cursor direction keys for communicating direction information and command selections to the SMT processor 304, and for controlling cursor movement on the display 312. The cursor control 316 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the SMT processor 304 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 310. Volatile media may include dynamic memory, such as main memory 306. Transmission media may include coaxial cables, copper wire and fiber optics, including wires of the bus 302. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the SMT processor 304 for execution. For example, the instructions may initially be borne on a magnetic disk of a remote computer. The remote computer can load the instructions into its dynamic memory and send the instructions over a telephone line using a modem. A modem local to the front-end server 102 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the SMT processor 304 retrieves and executes the instructions. The instructions received by the main memory 306 may optionally be stored on the storage device 310 either before or after execution by the SMT processor 304.

The front-end server 102 may also include a communication interface 318 coupled to the bus 302. The communication interface 318 typically provides a two way data communication coupling between the front-end server 102 and the network 110. For example, the communication interface 318 may be an integrated services digital network (ISDN) card or a modem used to provide a data communication connection to a corresponding type of telephone line. As another example, the communication interface 318 may be a local area network (LAN) card used to provide a data communication connection to a compatible LAN. Wireless links may also be implemented. Regardless of the specific implementation, the main function of the communication interface 318 is to send and receive electrical, electromagnetic, optical, or other signals that carry digital data streams representing various types of information.

In accordance with the disclosed embodiments, a processor usage tuner 320, or more accurately, the computer-readable instructions therefor, may reside on the storage device 310. Additionally, an adjustment factor utility 322 may also reside on the storage device 310 in some embodiments. The processor usage tuner 320 may then be executed to compensate for any distortion that may be present in the CPU usage reported by Windows Server 2003 (and similar operating systems) for the front-end server 102. The compensation may be based on a generic adjustment factor applicable to multiple servers, or it may be based on a particular adjustment factor that is specific to the front-end server 102. Similarly, the adjustment factor utility 322 may be executed from time to time or as needed to generate an adjustment factor for the front-end server 102. The adjustment factor may then be used by itself as a server-specific adjustment factor, or it may be combined with results from other adjustment factor utility 322 to derive a generic adjustment factor. The generic adjustment factor may then be inputted to the processor usage tuner 320 and used as needed for distortion compensation.

It should be noted that, in some embodiments, instead of residing on the storage device 310 of the front-end server 102, either the processor usage tuner 320 or adjustment factor utility 322, or both, may instead be run from a central location on the network 110. In terms of programming language, both the processor usage tuner 320 and adjustment factor utility 322 may also be implemented using any suitable programming language known to those having ordinary skill in the art, including Java, C++, Visual Basic, and the like.

Referring now to FIG. 4, in one embodiment, the processor usage tuner 320 may comprise a number of functional components, including a user interface module 400, a processor usage acquisition module 402, a processor usage correction module 404, and a data compilation module 406. Other functional components may also be added to or removed from the processor usage tuner 320 without departing from the scope of the disclosed embodiments. Note that although the various functional components 400-406 of the processor usage tuner 320 have been shown as discrete units in FIG. 4, those having ordinary skill in the art will understand that two or more of these components may be combined into a single component, and that any individual component may be divided into several constituent components, without departing from the scope of the disclosed embodiments.

In general, the user interface module 400 is responsible for allowing the user to interact with the various functional components of the processor usage tuner 320 as needed. To this end, the user interface module 400 may provide a graphical user interface for receiving input from the user. Such input may include, for example, an adjustment factor that the processor usage tuner 320 may use to compensate for distortions in the estimated CPU usage reported by thread-aware operating systems like Windows Server 2003. More precisely, the input may be an equation or a lookup table that may then be used as the adjustment factor to compensate for distortions in the CPU usage estimate. The equation or lookup table may be a standard one applicable to multiple servers, or it may be a server-specific adjustment factor applicable to a particular server only. In some embodiments, instead of manual user input, it is also possible for the equation or look up table to be provided to the processor usage tuner module 320 automatically, for example, from a predefined database containing generic and/or server-specific equations and/or lookup tables for various servers. In any event, in addition to receiving inputs, the graphical user interface may also be used to present the results of the compensated CPU usage to the user.

The processor usage acquisition module 402 may function to acquire the CPU usage estimates made by thread-aware operating systems like Windows Server 2003. In one implementation, the processor usage acquisition module 402 may be configured to invoke or otherwise call an appropriate process of the operating system, such as "Perfmon," "Typeperf," and other performance monitoring processes. The processor usage acquisition module 402 may then obtain an estimate for the CPU usage from the operating system process invoked. It is also possible for the processor usage acquisition module 402 to invoke the operating system's thread state counter to determine the thread state of each processor (i.e., whether a constructive thread is running on the processor). The processor usage acquisition module 402 may thereafter use the thread state to conduct its own estimate of CPU usage in a manner similar to that employed by the operating system to obtain an estimate of the CPU usage.

The estimate of CPU usage may then be provided to the processor usage correction module 404 for compensation of any distortion in the estimates provided by the operating system. In one embodiment, the processor usage correction module 404 may perform this compensation by applying the equation provided via the user interface module 400 (or obtained automatically from a repository) to the CPU usage estimate. The processor usage correction module 404 may also perform the compensation by looking up the compensated estimate in a lookup table provided via the user interface module 400 (or obtained automatically from a repository). In either case, processor usage correction module 404 may thereafter provide the compensated estimate to the user interface module 400 for presentation to a user as needed or requested.

Some or all of the compensated CPU usage estimates may also be collected and stored by the data compilation module 406. The data compilation module 406 may function to store the compensated CPU usage estimates along with various information therefor, such as time and date, server and/or processor name, and the like, in a usage data repository (not expressly shown). This compilation function may be performed for a certain time interval of interests, such as during periods of particularly heavy processing load, or it may be performed on an ongoing basis. The compiled data may then be analyzed for historical trends and usage patterns for the front-end server 102. Similar data may be compiled for other front-end servers 102, backend servers 104, and/or databases 106 in order to construct a more comprehensive picture of CPU usage. Such data may then be used to support capacity planning decisions, equipment cost allocations, and the like.

Figure 5:
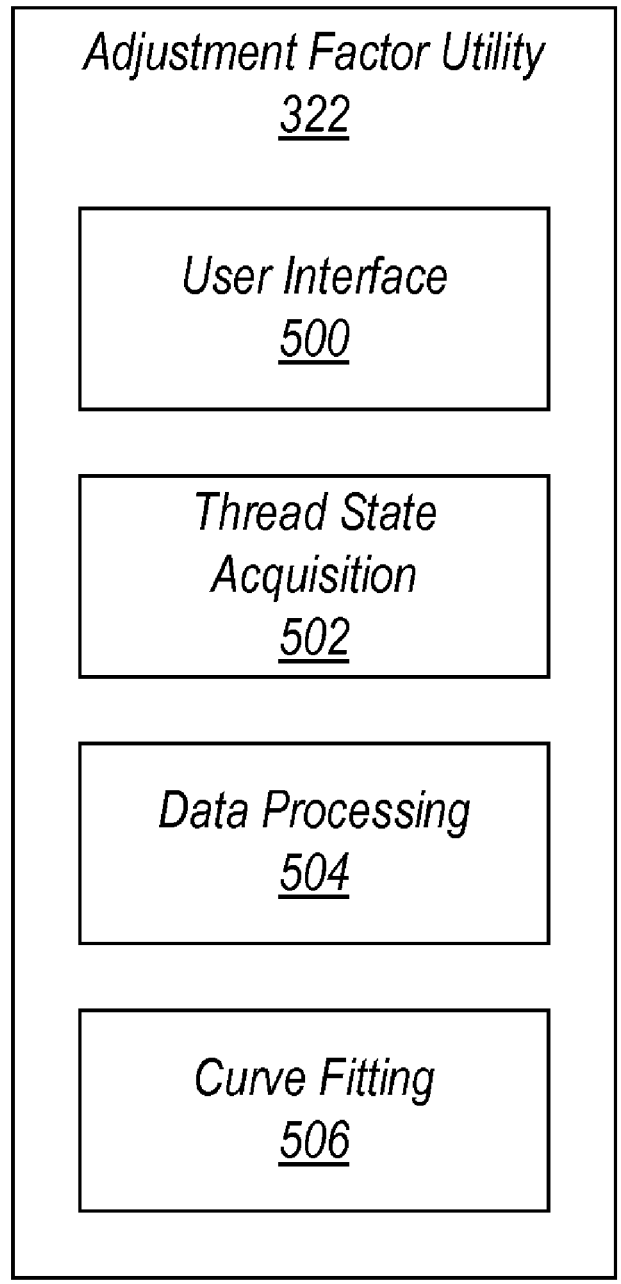
FIG. 5 illustrates an exemplary utility for determining an adjustment factor according to the disclosed embodiments.

As for the adjustment factor, the adjustment factor utility 322 may be configured to determine this adjustment factor, as illustrated in FIG. 5. Like the processor usage tuner 320, the adjustment factor utility 322 may comprise a number of functional components, including a user interface module 500, a thread state acquisition module 502, the data processing module 504, and a curve fitting module 506. And as with the processor usage tuner 320, other functional components may be added to or removed from the adjustment factor utility 322 without departing from the scope of the disclosed embodiments. Note that although the adjustment factor utility 322 and the processor usage tuner 320 are both shown on the front-end server 102 (FIG. 3), one may certainly be present on the front-end server 102 without the other, and vice versa, without departing from the scope of the disclosed embodiments.

In general, the user interface module 500 is responsible for allowing the user to interact with the various functional components of the adjustment factor utility 322 as needed. To this end, the user interface module 500 may provide a graphical user interface for receiving input from the user. Such input may include, for example, the frequency with which to sample thread states, the overall duration in which to obtain samples, and the like. Any suitable style of graphical user interface may be used, as the particular design, layout, color scheme, and so forth, are not overly important to the practice of the disclosed embodiments. In addition to receiving inputs, the graphical user interface of the user interface module 500 may also present the results of the adjustment factor determination to the user in some embodiments.

The thread state acquisition module 502 may function to acquire the states of the various threads (e.g., whether they are idle or being run by the logical processors) along with the level of CPU usage reported by the operating system. Recall from the discussion with respect to the graph in FIG. 2 above that the CPU usage reported by the operating system may be distorted, and that the distribution of the number of threads running on the logical processors may be used to determine an adjustment factor. In one implementation, the thread state acquisition module 502 may invoke or otherwise call a thread state counter, such as the one provided with Windows Server 2003. The thread state acquisition module 502 may then acquire the thread state for each logical processor of the physical SMT processor. This thread state acquisition may be performed at a sufficiently high frequency and over a sufficiently long interval so as to generate enough data for those having ordinary skill in the art to consider statistically valid. For example, the thread state acquisitions may be performed three times per second, twice per second, once every second, once every two seconds, once every three seconds, and so on. Similarly, the acquisition interval may be a quarter of an hour, half an hour, one hour, two hour, three hours, various combinations thereof, and so on.

The data processing module 504 may then be used to process the data acquired by the thread state acquisition module 502. In one implementation, the data processing module 504 may disregard threads that are not considered to be legitimate threads, such as overhead threads resulting from the use of the thread state counter, as well as idle threads. The data processing module 504 may then group the reported CPU usage according to some predetermined criterion, for example, the nearest 10%. The resulting distribution may represent a fairly accurate estimate of the actual distribution of the number of running threads for various levels of reported CPU usage.

Once the data has been processed, an adjustment factor for the front-end server 102 may then be determined by the curve fitting module 506. In one embodiment, the curve fitting module 506 may determine the adjustment factor by applying well-known curve fitting techniques, such as regression analysis, to the data acquired by the thread state acquisition module 502. An equation may then be derived that may be used to calculate the compensated estimate of CPU usage for the front-end server 102. The equation may then be stored in an appropriate repository, provided as needed to processor usage tuner 320 (to compensate for any distortion in the CPU usage), and the like. In some embodiments, instead of an equation, the curve fitting module 506 may simply create a lookup table using the data acquired by the thread state acquisition module 502 (and processed by the data processing module 504). The lookup table may then be stored in an appropriate repository and used to look up a compensated estimate for the CPU usage reported.

Figure 6:
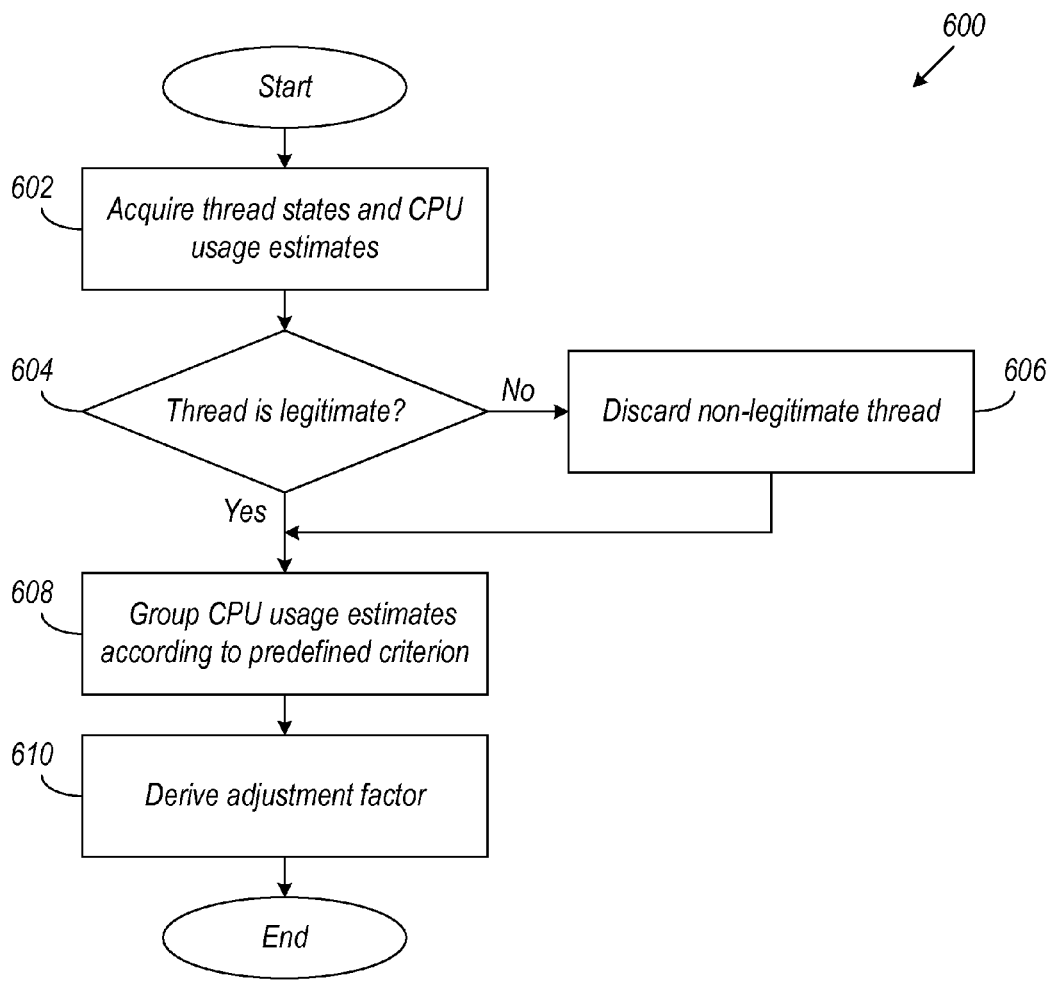
FIG. 6 illustrates an exemplary method of determining an adjustment factor according to the disclosed embodiments.
Figure 7:
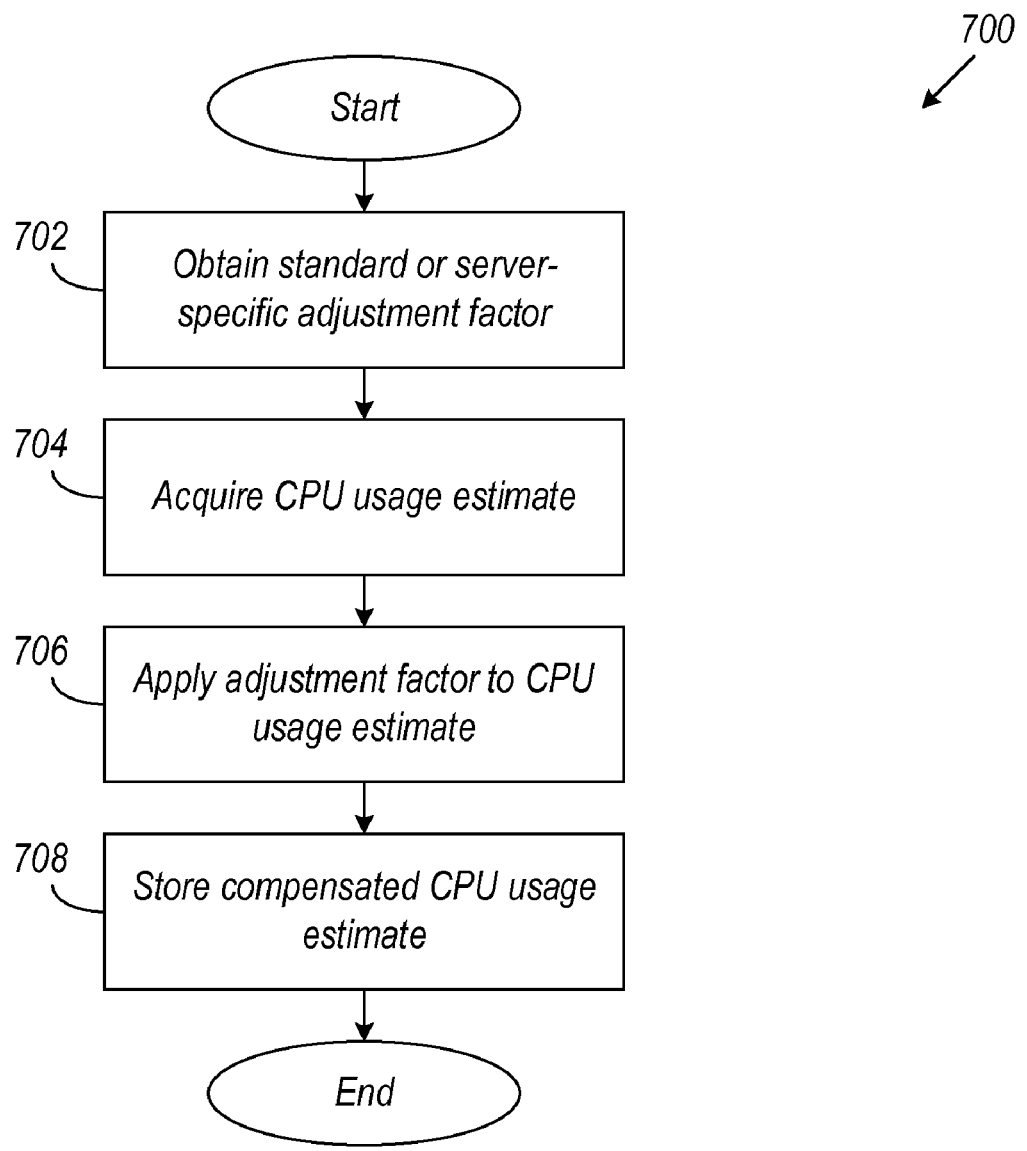
FIG. 7 illustrates an exemplary method of compensating CPU usage estimates according to the disclosed embodiments.

Thus far, specific embodiments have been disclosed for providing compensated estimates of CPU usage. Referring now to FIGS. 6-7, general guidelines are shown in the form of methods that may be used to implement the various embodiments disclosed above. As can be seen in FIG. 6, a method 600 of determining an adjustment factor for an SMT processor begins at block 602, where thread states and CPU usage data are acquired, for example, by invoking a thread state counter of the operating system. The data may be acquired at a predetermined frequency and over a predetermined interval, such as once per second or a one-hour interval. At block 604, a determination is made as to whether the threads are legitimate threads; that is, the threads are not overhead threads or idle threads. If the answer is no, then the threads are discarded at block 606. If the answer is yes, then the method 600 continues at block 608, where the CPU usage estimates are grouped according to a predetermined criterion, for example, the nearest 10%. The resulting distribution is believed to represent a fairly accurate estimate of the actual distribution of the number of running threads for various levels of reported CPU usage. Curve fitting techniques may then be applied at block 610 to the distribution of threads to determine an equation for the distribution. The equation may then be used to calculate an adjustment factor. Alternatively, instead of an equation, a lookup table may be created from the threads and used to look up the adjustment factor.

FIG. 7 illustrates a method 700 of compensating for distortions in the reported CPU usage according to the disclosed embodiments. The method 700 begins at block 702, where an adjustment factor, or rather the equation or lookup table that may be used to drive the adjustment factor, may be obtained. The equation or lookup table may be a standard one applicable to multiple servers (and the SMT processors therein), or it may be a server-specific equation or lookup table applicable to a particular server only. At block 704, a CPU usage estimate is acquired, for example, by invoking a special process (e.g., "Typeperf," "Perfmon," etc.) of the operating system designed for monitoring the performance of the processor. An adjustment factor is calculated for the CPU usage estimate, for example, from the equation or the lookup table. The adjustment factor is then applied to the reported CPU usage estimate to obtain a compensated estimate at block 706. At block 708, the compensated estimate may be stored for subsequent used to detect historical trends and usage pattern in support of any capacity planning, cost allocation, or the like.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for planning a computing capacity expansion, the system comprising:

at least one subsystem configured to analyze current CPU usage data for currently available computing units that contain a simultaneous multi-threading (SMT) processor;

at least one subsystem configured to apply a correction factor to adjust the current CPU usage data to determine corrected CPU usage data, the correction factor being determined in accordance with a predetermined period of time and a number of threads;

at least one subsystem configured to compile corrected CPU usage data over the predetermined period of time and to store compiled corrected CPU usage data in a database; and at least one subsystem configured to provide a capacity planning system access to the database.

2. The system of claim 1, further comprising at least one subsystem configured to apply the correction factor if the current CPU usage data applies to a processor that contains an SMT processor.

3. The system of claim 1, wherein the at least one subsystem configured to apply a correction factor comprises at least one subsystem configured to apply a CPU usage adjustment factor to the current CPU usage data.

4. The system of claim 3, further comprising at least one subsystem configured to retrieve the CPU usage adjustment factor according to one of: manually from a user, and automatically from an adjustment factor repository.

5. The system of claim 1, wherein the currently available computing units include one of: a personal computer, a server, a workstation, and a mainframe.

6. The system of claim 1, wherein the currently available computing units are operated as one of: an intranet server, an application server, a database server, a fax server, a file server, an e-mail server, a security server, and an active directory server.

7. The system of claim 1, further comprising at least one subsystem configured to provide historical CPU usage data to the capacity planning system for the currently available computing units, wherein a number of additional computing units is projected based on the historical CPU usage data.

8. A method of planning a computing capacity expansion, the method comprising:

analyzing current CPU usage data for currently available computing units that contain a simultaneous multi-threading (SMT) processor;

applying a correction factor to adjust the current CPU usage data to determine corrected CPU usage data, the correction factor being determined in accordance with a predetermined period of time and a number of threads;

compiling corrected CPU usage data over the predetermined period of time and to store compiled corrected CPU usage data in a database; and providing a capacity planning system access to the database.

9. The method of claim 8, further comprising applying the correction factor if the current CPU usage data applies to a processor that contains an SMT processor.

10. The method of claim 8, wherein the applying a correction factor comprises at least one subsystem configured to apply a CPU usage adjustment factor to the current CPU usage data.

11. The method of claim 10, further comprising retrieving the CPU usage adjustment factor according to one of: manually from a user, and automatically from an adjustment factor repository.

12. The method of claim 8, wherein the currently available computing units include one of: a personal computer, a server, a workstation, and a mainframe.

13. The method of claim 8, wherein the currently available computing units are operated as one of: an intranet server, an application server, a database server, a fax server, a file server, an e-mail server, a security server, and an active directory server.

14. The method of claim 8, further comprising providing historical CPU usage data to the capacity planning system for the currently available computing units, wherein a number of additional computing units is projected based on the historical CPU usage data.

15. A tangible computer-readable medium encoded with computer-readable instructions for planning a computing capacity expansion, the computer-readable instructions comprising instructions for causing a computer to:

analyze current CPU usage data for currently available computing units that contain a simultaneous multi-threading (SMT) processor;

apply a correction factor to adjust the current CPU usage data to determine corrected CPU usage data, the correction factor being determined in accordance with a predetermined period of time and a number of threads;

compile corrected CPU usage data over the predetermined period of time and to store compiled corrected CPU usage data in a database; and provide a capacity planning system access to the database.

16. The tangible computer-readable medium of claim 15, further comprising instructions for causing a computer to apply the correction factor if the current CPU usage data applies to a processor that contains an SMT processor.

17. The tangible computer-readable medium of claim 15, wherein the instructions for causing a computer to apply a correction factor comprises instructions to apply a CPU usage adjustment factor to the current CPU usage data.

18. The tangible computer-readable medium of claim 17, further comprising instructions for causing a computer to retrieve the CPU usage adjustment factor according to one of: manually from a user, and automatically from an adjustment factor repository.

19. The tangible computer-readable medium of claim 15, wherein the currently available computing units include one of: a personal computer, a server, a workstation, and a mainframe.

20. The tangible computer-readable medium of claim 15, wherein the currently available computing units are operated as one of: an intranet server, an application server, a database server, a fax server, a file server, an e-mail server, a security server, and an active directory server.

21. The tangible computer-readable medium of claim 15, further comprising instructions for causing a computer to provide historical CPU usage data to the capacity planning system for the currently available computing units, wherein a number of additional computing units is projected based on the historical CPU usage data.

* * * * *